United States Patent Office 2,891,953
Patented June 23, 1959

2,891,953

3-AMINO-6-SUBSTITUTED PYRIDAZINES AND METHODS OF PREPARING AND UTILIZING SAME

Joe H. Clark, Woodcliff Lake, N.J., and William Edgar Taft, Stamford, Conn., assignors to American Cyanamid Company, New York, N.Y., a corporation of Maine No Drawing. Application July 9, 1956
Serial No. 596,451

5 Claims. (Cl. 260—250)

This invention relates to new compounds useful in the preparation of certain sulfanilamidopyridazines. This invention relates further to a method of preparing these new compounds and further still to a method of converting these new compounds to useful sulfanilamidopyridazines.

These new compounds of the present invention have the following general formula:

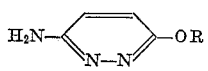

wherein R is an alkyl, aryl or aralkyl radical. The alkyl radical may be methyl, ethyl, n-propyl, isopropyl, butyl, amyl, hexyl, or the like. The aryl radical may be phenyl, naphthyl, or the like, and the aralkyl radical may be benzyl, phenethyl, phenpropyl, phenbutyl, or the like.

Patent No. 2,712,012 discloses and claims certain 3-sulfanilamido-6-substituted pyridazines, the substituents at the 6 position being alkoxy, aryloxy or aralkoxy. The compounds of the reference patent show improved therapeutic effects as compared with sulfadiazine and sulfapyridazine. The compounds of the present invention are useful as intermediates in preparing the compounds disclosed and claimed in Patent No. 2,712,012. The method for producing the 3-sulfanilamido-6-substituted pyridazines of the reference patent involves the fusion of 3,6-dichloropyridazine with sulfanilamide followed by displacement of the remaining chlorine atom by an alkoxy, aryloxy, aralkoxy group through the use of sodium methoxide or its appropriate homolog or analog.

The methods for preparing the new compounds of the present invention and their subsequent conversion are simpler in that 3-amino-6-chloropyridazine is reacted in solution with a soluble alkali metal alkoxide, aryloxide or aralkoxide, preferably at temperatures ranging from 50° to 200° C. for 2 to 100 hours, to form the new compounds of this invention. The solvent utilized in this method may be an alcohol having the same number of carbons as it is desired to substitute at the 6 position. For example, in preparing 3-amino-6-methoxy pyridazine one may use methanol; in preparing 3-amino-6-n-hexoxy pyridazine one may use n-hexanol. On the other hand, if one were to react 3-amino-6-chloropyridazine with sodium methoxide in n-hexanol, one would produce a mixture of 3-amino-6-methoxy pyridazine and 3-amino-6-n-hexoxy pyridazine. Alternately, in place of the alcohols, one may utilize certain inert organic solvents, for example, toluene xylene, and homologous aromatic hydrocarbons. The acylic hydrocarbons may be used also, for example, hexane, heptane, and homologous acyclic hydrocarbons. In the purification procedure that follows the reaction, the resulting colored crystalline solid may be dissolved in an organic solvent and treated with an absorbent material such as activated charcoal and filtered. Suitable solvents for this procedure are a mixture of petroleum ether and chloroform wherein the petroleum ether content may vary from 10% to 90% of the mixture, and the chloroform, likewise, may be 90% to 10%. Alternately, diethyl ether may be used as the organic solvent in this step of this process. Following this clarification step, the crystalline solid may be recrystallized and again treated with an absorbent.

These new compounds are then dissolved in a suitable solvent and p-acetylsulfanilyl chloride is reacted therewith for 10 minutes to 24 hours at temperatures of from 20° to 100° C. to form the 3-($N^4$-acetylsulfanilamido) derivative of the compounds of this invention. In the procedure tertiary amines are recommended as the solvent of choice, for example, the heterocyclic tertiary amines, pyridine, picoline and analogs and homologs thereof. Acyclic tertiary amines may be used also, for example, triethyl amine, tripropyl amine, etc. Moreover, aromatic tertiary amines such as N,N-dimethyl aniline and its analogs and homologs may be used. The product of this step of the reaction may also be recrystallized utilizing various alkanols or mixtures of alkanols with water. For example, 100% methanol, ethanol, propanol and other homologs may be used. Alternately, one may use any of the alkanols in combination with water wherein the alkanol varies from 75% to 90% and the water from 25% to 10%. This recrystallization then may be followed by a clarification step utilizing known absorbent such as activated charcoal. Alternately, any of the above recrystallizing steps can be replaced by vacuum sublimation or by precipitation by adding excess water to the organic solvent solution. These 3-($N^4$-acetylsulfanilamido) derivatives can then be deacylated by hydrolysis, or some equivalent procedure, to produce the 3-sulfanilamido-6-substituted pyridazines of Patent No. 2,712,012. The hydrolysis takes place in any soluble strong base, for example, sodium hydroxide, potassium hydroxide and barium hydroxide, for a period of from 10 minutes to 4 hours. The concentration of the strong base may vary from 2% to 40%. After this period of time the solution is buffered with a soluble buffer, such as a mixture of acetic acid and ammonium acetate, to a pH of from about 4 to 6 to precipitate the product. The acetic acid content of this solution may vary from 1 to 2 parts by weight and the ammonium acetate from about 1 to 6 parts by weight in 2 to 30 parts by weight of water.

The preparation of the new compounds of this invention and their conversion to the therapeutically active compounds referred to above is described in greater detail in the following examples. These examples are presented by way of illustration only, the scope of the invention being limited by the scope of the appended claims.

EXAMPLE 1

3-amino-6-methoxypyridazine

A total of 3.40 g. (0.026 mol) of 3-amino-6-chloropyridazine was placed in a Carius tube with a solution of sodium methoxide in methanol [prepared from 0.61 g. (0.027 mol) of clean sodium metal and 50 ml. of methanol], and the Carius tube was sealed. The tube was placed in a Carius furnace and maintained at 120° C. for 20 hours. After the tube was cooled and opened, the contents were removed and the light brown solid was filtered off. The filtrate was evaporated to dryness at room temperature under an air jet. The resulting orange-brown crystalline solid was dissolved in a 60:40 petroleum ether-chloroform solution, treated with activate charcoal and filtered. There was obtained, upon cooling, 1.1 g. (34%) of a pale yellow crystalline solid melting at 100°–104° C. Recrystallization of this crystalline solid from n-amyl chloride accompanied by treatment with activated charcoal yielded 0.51 g. of a white, crystalline solid melting at 103–105° C.

Calc'd. for $C_5H_7N_3O$: Percent C, 47.99; percent H, 5.64, percent N, 33.58. Found: Percent C, 47.72, percent H, 5.73; percent N, 33.73.

An infrared spectrum of the compound indicated characteristic absorption bands of the primary aromatic amino group and of the methyl group.

EXAMPLE 2

*3-(N⁴-acetylsulfanilamido)-6-methoxypyridazine*

A total of 0.29 g. (0.0023 mol) of 3-amino-6-methoxypyridazine was dissolved in 2 ml. of dry pyridine in a small test tube surrounded by an oil bath at 50° C. To this solution was added, in small amounts with stirring during 10 minutes, a solution of 0.57 g. (0.0024 mol) of p-acetylsulfanilyl chloride in 1.5 ml. of dry pyridine. The resulting light brown solution was maintained at 60° C. with intermittent stirring for 30 minutes; it was then cooled and poured into sufficient 0.1 N sodium hydroxide to give a pH of 7. The volatiles were removed at room temperature under vacuum, and the residue was triturated with water and filtered off. After recrystallization from 3:1 methanol-water accompanied by treatment with activated charcoal, there was obtained a slight off-white crystalline product melting at 215–218° C. The melting point remained undepressed on admixture with a known sample of 3-(N⁴-acetylsulfanilamido) - 6-methoxy pyridazine. The infrared absorption curves of these two sample were identical.

EXAMPLE 3

*Hydrolysis of 3 - (N⁴ - acetylsulfanilamido) - 6-methoxypyridazine to 3-sulfanilamido-6-methoxypyridazine*

A total of 0.32 g. (1.0 mol) of 3-(N⁴-acetylsulfanilamido)-6-methoxypyridazine was dissolved in 8 g. of a 10% solution of sodium hydroxide. The solution was refluxed 45 minutes then cooled and buffered to pH 5.5 by addition to a solution of acetic acid and ammonium acetate in water. The resulting white, crystalline precipitate was filtered off, washed and dried; its weight was 0.22 g. Its melting point, 182.5° to 183.5° C., remained undepressed on admixture with a known sample of 3-sulfanilamido-6-methoxypyridazine. A comparison of an infrared absorption curve of this product with that of a known sample of 3-sulfanilamido-6-methoxypyridazine indicated the product to consist essentially of the same compound.

EXAMPLE 4

*3-amino-6-n-hexoxypyridazine*

A total of 3.95 g. (0.0305 mol) of 3-amino-6-chloropyridazine was added to a solution of 1.22 g. (0.0305 mol) of clean sodium metal in 50 ml. of freshly distilled n-hexanol, and the mixture was refluxed for 24 hours. The sodium chloride was filtered off, and the excess hexanol was stripped from the filtrate under vacuum. The dark residue was subjected to a vacuum sublimation (100°–125° C. at about 0.3 mm. of Hg) which yielded 3.1 g. of a light orange-brown waxy solid melting at 25–30° C. Analysis and infrared spectrum indicated it to be 3-amino-6-n-hexoxypyridazine.

EXAMPLE 5

*3-(N⁴-acetylsulfanilamido-6-n-hexoxypyridazine*

A total of 0.90 g. (0.0046 mol) of 3-amino-6-n-hexoxypyridazine was dissolved in 4 ml. of pyridine in a tube surrounded by a bath at 50° C. To this solution was added during 10 minutes with stirring a solution of 1.23 g. (0.0052 mol) of p-acetylsulfanilyl chloride, the temperature being maintained at 50° to 55° C. On completion of the addition, the reddish-brown solution was maintained at 60°–65° C. with intermittent stirring for 4 hours. The solution was cooled and neutralized with 0.2 N sodium hydroxide solution. The volatiles were removed under vacuum to leave an amorphous, brown, somewhat gummy residue; this residue was partially dissolved with 20 ml. of 0.5 N sodium hydroxide. The aqueous fraction was separated from a lower, dark brown oily layer by centrifuging. The aqueous layer was buffered to pH 5 by addition to an acetic acid-ammonium acetate solution. After the resulting light brown, gummy precipitate was separated, it was dissolved in methanol, treated with activated charcoal and clarified. The methanol solution was diluted by the dropwise addition of water with stirring. The resulting pale yellow precipitate was filtered, washed and dried; it had a melting point of 152°–159.5° C. The product was redissolved in sodium hydroxide, filtered and reprecipitated at pH 5. The precipitate was dissolved in methanol, treated with activated charcoal and clarified. Dropwise addition of water to the methanol solution with stirring yielded a white, flocculent, precipitate which was filtered off, washed, and dried in an oven at 85° C. yielding a product having a melting point of 164.5°–165.5° C. The infrared absorption curve was consistent with the structure proposed above.

*Analysis.*—Calc'd for $C_{18}H_{24}N_4O_4S$: Percent N, 14.28. Found: Percent N, 14.53.

The hydrolysis of this product to 3-sulfanilamido-6-n-hexoxypyridazine proceeds in a manner similar to the hydrolysis of the methoxy derivative.

EXAMPLE 6

*3-amino-6-phenoxypyridazine*

A solution of 3.9 g. (0.03 mol) of 3-amino-6-chloropyridazine in 50 g. of phenol was treated with 3.5 g. (0.03 mol) of sodium phenolate and heated in an oil bath with stirring at 150° C. for 24 hours. The cooled reaction mixture was poured into dilute sodium hydroxide to dissolve the excess phenol. The insoluble residue thereby produced was recrystallized from ether to obtain 3-amino-6-phenoxypyridazine. This new compound is then converted to the corresponding 3-sulfanilamido-6-phenoxypyridazine in substantially the same manner as in the foregoing examples.

EXAMPLE 7

*3-amino-6-benzyloxypyridazine*

To a solution of 0.03 mol of sodium benzylate in benzyl alcohol (prepared by dissolving 0.7 g. of clean sodium metal in 50 cc. of benzyl alcohol) was added 3.9 g. (0.03 mol) of 3-amino-6-chloropyridazine. The mixture was heated with stirring at 150° C. for 24 hours. Most of the benzyl alcohol was then distilled off at reduced pressure. The residue was treated with an excess of dilute hydrochloric acid. The acid solution was extracted with ether and the extracts discarded. The aqueous solution was then made alkaline with sodium hydroxide and the precipitated 3-amino-6-6-benzyloxypyridazine was separated and purified by recrystallization from ether. This new compound was then converted to the corresponding 3-sulfanilamido-6-benzyloxypyridazine in substantially the same manner as in the foregoing examples.

We claim:

1. A compound of the group having the formula:

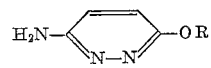

wherein R is a member of the group consisting of lower alkyl, phenyl and phenyl lower alkyl radicals.

2. The compound, 3-amino-6-methoxypyridazine.
3. The compound, 3-amino-6-n-hexoxypyridazine.
4. The compound, 3-amino-6-phenoxypyridazine.
5. The compound, 3-amino-6-benzyloxypyridazine.

References Cited in the file of this patent

UNITED STATES PATENTS

| 2,371,115 | Winnek | Mar. 6, 1945 |
| 2,712,012 | Clark | June 28, 1955 |

FOREIGN PATENTS

| 163,915 | Australia | July 6, 1955 |
| 242,492 | Switzerland | Oct. 1, 1946 |

OTHER REFERENCES

Overend et al.: J. Chem. Soc. (British), 3500–5 (1950).